United States Patent [19]

Hayashi et al.

[11] Patent Number: 5,793,171
[45] Date of Patent: Aug. 11, 1998

[54] CONTROL CIRCUIT FOR CONTROLLING THE DRIVING OF A DC MOTOR FOR A MIRROR ASSEMBLY OF A VEHICLE

[75] Inventors: Kazuyasu Hayashi; Hisaki Hashimoto, both of Isehara, Japan

[73] Assignee: Ichikoh Industries, Ltd., Tokyo, Japan

[21] Appl. No.: 623,692

[22] Filed: Mar. 29, 1996

[30] Foreign Application Priority Data

Mar. 29, 1995 [JP] Japan ................... 7-071758

[51] Int. Cl.$^6$ ........................................ H02P 3/00
[52] U.S. Cl. ........................ 318/434; 318/471; 361/27
[58] Field of Search .................... 318/471, 434; 388/404; 361/23–33, 34, 103–106

[56] References Cited

U.S. PATENT DOCUMENTS

| | | | |
|---|---|---|---|
| 3,803,866 | 4/1974 | Barry | 62/230 |
| 3,965,392 | 6/1976 | Moorhead et al. | 361/29 |
| 4,066,937 | 1/1978 | Pfarrer et al. | 318/775 |
| 4,084,202 | 4/1978 | Stoll | 361/24 |
| 4,161,681 | 7/1979 | Rathje | 318/783 |
| 4,716,486 | 12/1987 | Janusz et al. | 361/24 |
| 5,053,908 | 10/1991 | Cooper et al. | 361/24 |
| 5,229,695 | 7/1993 | Hirokazu et al. | 318/434 |
| 5,502,609 | 3/1996 | Thomas et al. | 361/6 |

FOREIGN PATENT DOCUMENTS 4-76196  7/1992  Japan.

Primary Examiner—Jonathan Wysocki
Attorney, Agent, or Firm—Foley & Lardner

[57] ABSTRACT

When a switch 12 is turned on, a relay coil 14b is excited by a current generated at the very moment when electric power of a dc power source 11 is supplied to a condenser 16 for actuation. Accordingly, a relay contact 14a is closed, and the power is given to a dc motor 15 via the switch 12 and the relay contact 14a. As a result, the dc motor 15 is actuated. At the same time, a part of a current running through the dc motor 15 is supplied to the relay coil 14b and brings about self-hold by which the dc motor 15 remains running. After that, when the driving of a device to be driven is forcibly regulated, an excess current passing through the dc motor 15 flows to a PTC thermistor (positive temperature coefficient thermistor) 13 which is connected in series to the dc motor 15. Owing to the excess current, the temperature of the PTC thermistor 13 is raised, and thereby the resistance of the PTC thermistor 13 is heightened. As a result, the relay contact 14a is opened to stop the dc motor 15. In a motor control circuit thus constructed, in order to prevent chattering which occurs when the dc motor 15 is operated to stop, and prevent the delay of the stop of the dc motor 15 and, additionally, lengthen the service life of the relay contact 14a, the PTC thermistor 13 is disposed to be in parallel with the condenser 16 with respect to the dc power source 11.

5 Claims, 6 Drawing Sheets

CONTROL CIRCUIT FOR CONTROLLING THE DRIVING OF A DC MOTOR FOR A MIRROR ASSEMBLY OF A VEHICLE

BACKGROUND OF THE INVENTION

1. Field of the Invention

This invention relates to a control circuit suitable to control a direct-current motor used as a driving source for driving a motor-driven retractable door mirror, a power window, a power seat, and the like which are provided in a motor vehicle.

2. Description of the Prior Art

Figure 5A:
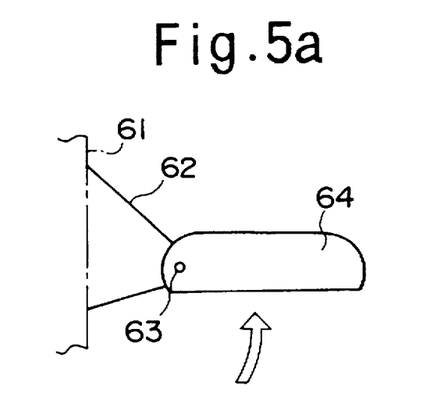
FIG. 5a is a descriptive drawing of a motor-driven retractable door mirror device which is in an in-use position.
Figure 5B:
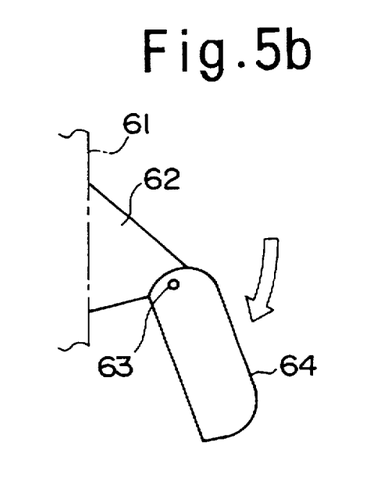
FIG. 5b is a descriptive drawing of the motor-driven retractable door mirror device which is in a retracted position.

FIGS. 5a and 5b are each a schematic descriptive drawing of an electric retractable door mirror device provided in a motor vehicle. In the figures, a mirror base 62 is firmly fixed to the body 61 of the vehicle. A mirror assembly 64 to be driven which includes a mirror (not shown), etc. is rotatably fixed to the mirror base 62 via a shaft 63.

The mirror assembly 64 also includes a direct-current motor (not shown). By reversing the do motor, the mirror assembly 64 is rotated on the shaft 63 from a dormant position (where the mirror assembly 64 is retracted) shown in FIG. 5l to an in-use position (where the mirror assembly 64 performs its normal function) shown in FIG. 6a. On the other hand, by running the dc motor in a normal direction, the mirror assembly 64 is rotated on the shaft 63 from the in-use position to the dormant position. When the mirror assembly 64 reaches the in-use position with the returning motion or when the mirror assembly 64 reaches the dormant position with the retracting motion, the mirror assembly 64 is regulated not to move more by means of a stopping member (not shown).

Figure 6:
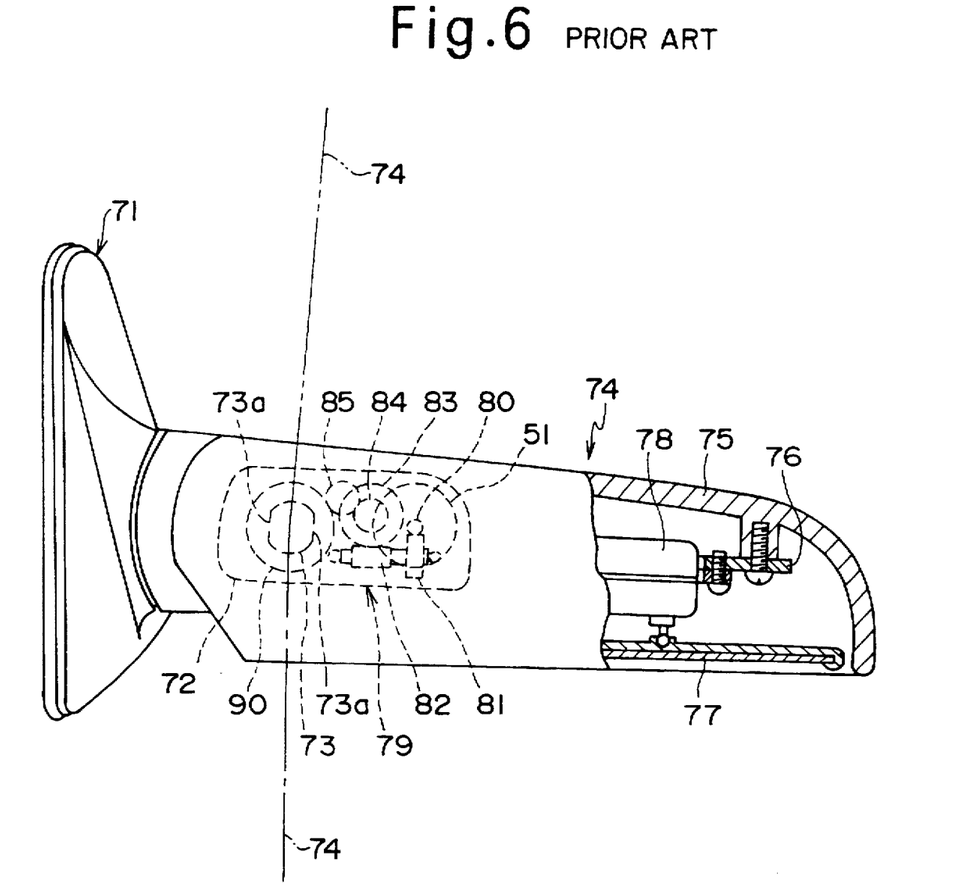
FIG. 6 is a plan view, partly in section, of the motor-driven retractable door mirror device.
Figure 7:
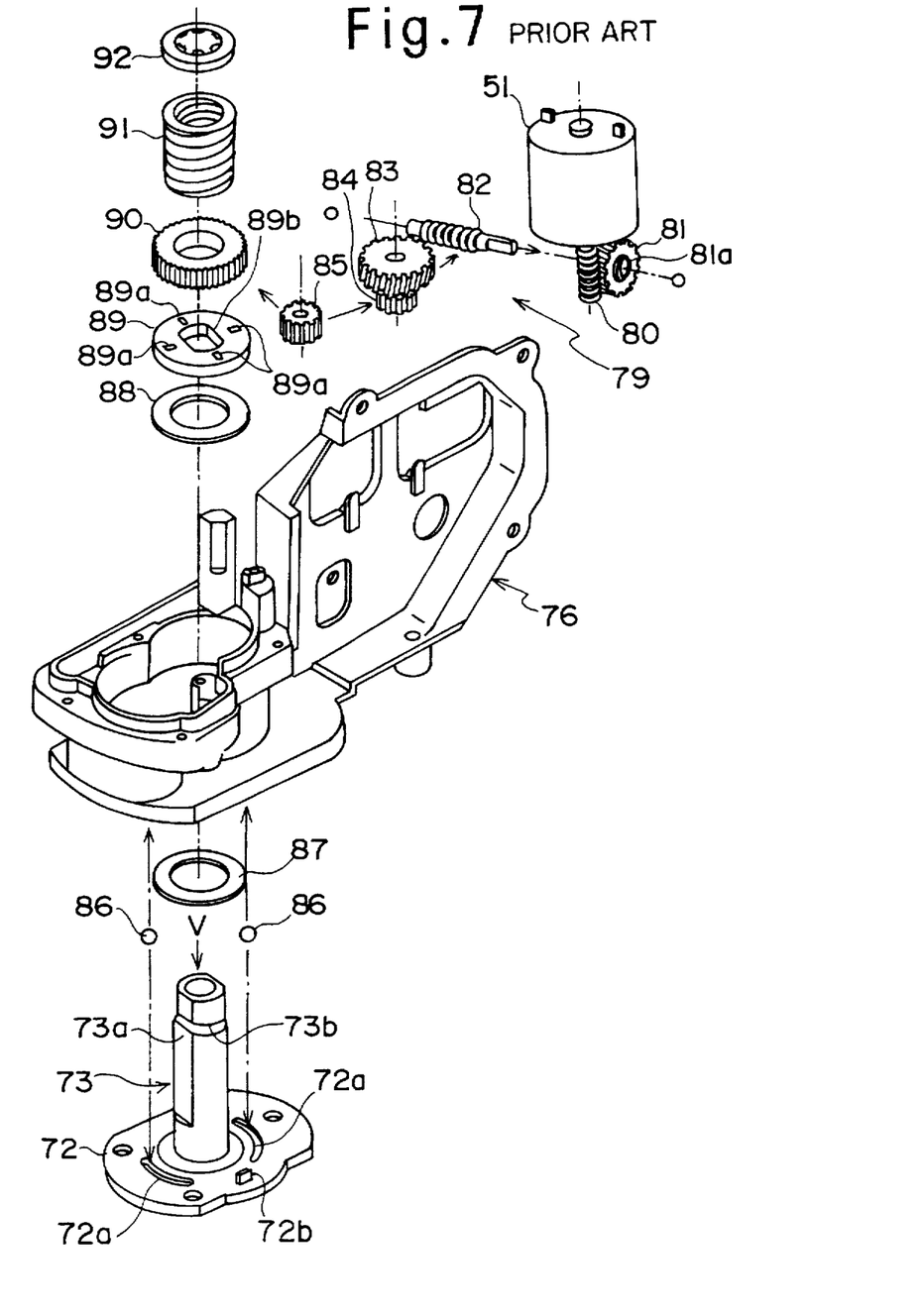
FIG. 7 is an exploded view of a main part of the motor-driven retractable door mirror device, showing its internal structure

FIGS. 6 and 7 show an example of such an electric retractable door mirror device (see Japanese Utility Model Application Early Laid-Open Publication No. Hei 4-76196). In FIG. 6, reference numeral 71 designates a mirror base, reference numeral 72 designates a shaft holder fastened to %he mirror base 71, reference numeral 73 designates a shaft extending from the shaft holder 72, and reference numeral 74 designates a mirror assembly.

The mirror assembly 74 includes a mirror housing 75, a unit bracket 76 fastened to the mirror housing 75, a mirror 77, a power unit 78 and a tilting driving portion 79 by both of which the mirror 77 is tilted.

As shown in FIG. 7, the tilting driving portion 79 comprises a dc motor 31, a worm gear 80 fastened to an output shaft (not shown) of the dc motor 51, a worm wheel 61 which meshes with the worm gear 80, a worm shaft 82 an end of which is cut D-shaped and is fitted into a center hole 81a of the worm wheel 81 so as to move in its axial direction but not to turn, a worm wheel 83 which meshes with the worm shaft 82, a gear 84 disposed coaxially with the worm wheel 83 so as to turn simultaneously with the worm wheel 83, and an idle gear 85 which meshes with the gear 84.

On the other hand, the shaft holder 72 has arc-shaped grooves 72a, 72a coaxial with the shaft 73 and each of which is engaged with a ball 86 buried in a bracket 76. The shaft holder 72 also has a projection 72b.

The shaft 73 has chamfers 73a, 73a extending in the direction of the axis of the shaft 73 and an engagement groove 73b formed on the upper side of the chamfer 73a and extending in the circumferential direction of the shaft 73. To the shaft 73 are coaxially fitted washers 87, 88, a clutch holder 89, a clutch gear 90 which meshes with the idle gear 85, a compression spring 91, and a push nut 92 which is engaged with the engagement groove 73b.

The clutch holder 89 has, on its upper surface, convex portions 89a which are fitted into corresponding concave portions (not shown) formed in the lower surface of the clutch gear 90. Usually, the convex and concave portions are in engagement with each other by the force of the compression spring 91. The clutch holder 89 has an engagement hole 89b which is engaged with the chamfers 73a.

When the de motor 51 runs in a normal or opposite direction, the idle gear 85 revolves round the clutch gear 90 while rotating on its axis. Thereby, the mirror assembly 74 rotates on the shaft 73.

When the balls 86 are slid along the arc-shaped grooves 72a, respectively, and reach the respective ends of the grooves 72a, the mirror assembly 74 reaches the limit of its rotation.

In FIG. 6, the alternate long and short dash line indicates a position where the mirror assembly 74 is retracted in a state of the end of the mirror assembly 74 being directed rearwards with respect to the vehicle body, whereas the alternate long and two short dashes line indicates a position where the mirror assembly 74 is retracted in a state of the end of the mirror assembly 74 being directed forwards with respect to the vehicle body.

If the mirror assembly 74 happens to strike against an obstacle or the like when the dc motor 51 is not running, the clutch gear 90 and the clutch holder 89 are disengaged from each other against the force of the compression spring 91, so that the mirror assembly 74 is rotated in a direction in which a shock to the mirror assembly 74 is reduced. As a result, the mirror assembly 74 and the dc motor 51 are prevented from being damaged.

By the way, such an electric retractable door mirror device has a control circuit for controlling the driving of the dc motor 51. When the dc motor 51 is caused to run in a normal or reverse direction and thereby the mirror assemblies 64, 74 are rotated and situated in a predetermined stopping position, the control circuit cuts off the electric supply to the dc motor 51 by electrically detecting the stopping of the mirror assemblies 64, 74 by various kinds of detecting means.

For example, referring to the mirror assembly 74, the control circuit stops the driving of the dc motor 51 such that, when the mirror assembly 74 is driven and situated in a retracted position (dormant position) or in an in-use position, the control circuit cuts off the electric supply to the do motor 51 by detecting the arrival of the mirror assembly 74 in the position by means of a positive temperature coefficient thermistor (PTC thermistor).

Figure 8:
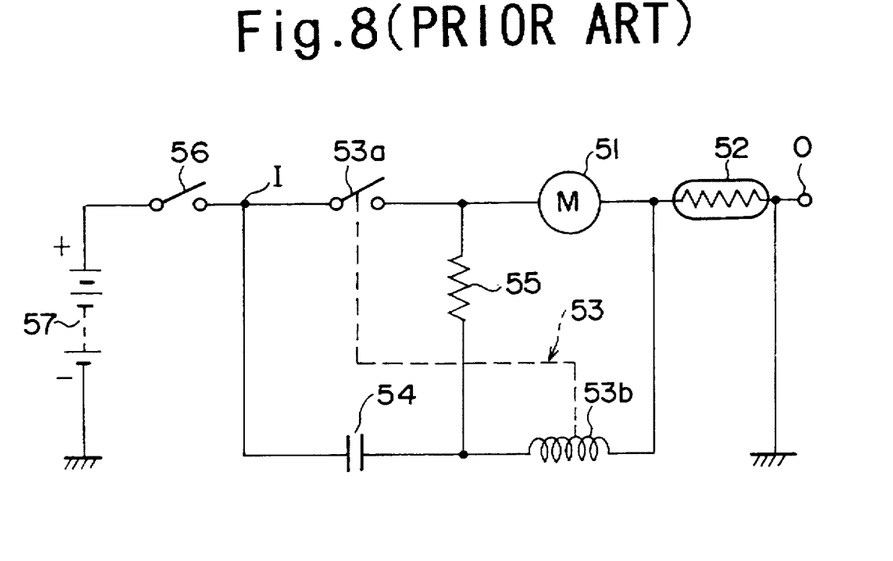
FIG. 8 shows a conventional control circuit for controlling the driving of a dc motor.

In other words, when the movement of the mirror assembly 74 is physically regulated by the stopping member (not shown), an over-current (excess current) passing through the dc motor 51 flows to the Pro thermistor 52 connected to the dc motor 51 in series, as shown in FIG. 8. When the resistance of the PTC thermistor 52 becomes stronger because of the generation of heat caused by the over-current, the relay contact 53a is opened (turned of.) to stop the dc motor 51.

In FIG. 8, reference character 53b designates a relay coil. A relay 53 is made up of the relay coil 53b and the relay contact 53a. Reference character 54 designates a condenser (capacitor) for actuating the dc motor 51, reference character 55 designates a resistance for relay self-hold, reference character 56 designates a remote control switch used as an operation switch for operating a thing (door mirror, power window, power seat, etc.) to be driven, and reference character 57 designates a battery source.

The dc motor 51 is actuated by closing the remote control switch 56 in order to retract or protract the mirror assembly 74. In detail, at the moment when the remote control switch 56 is turned on, a current passes through the battery source 57, the remote control switch 56, the condenser 54, the relay coil 53b, the PTC thermistor 52, and a vehicle body's ground, in order of mention. As a result, the relay coil 53b is excited.

Thereby, the relay contact 53a is closed and, as a result, the current from the battery source 67 Passes through the relay contact 53a, the dc Motor 51, the PTC thermistor 52, and the vehicle body's ground. In addition, a part of the current flowing from the relay contact 53a to the dc motor 51 branches off therefrom and passes through the resistance 55 for relay self-hold, the relay coil 53b, the PTC thermistor 52, and the vehicle body's ground. Accordingly, the relay coil 53b remains excited. Thereby, the dc motor 51 continues to run in the normal or reverse direction and accordingly the mirror assembly 74 is retracted or protracted.

The conventional control circuit mentioned above is arranged such that, through the PTC thermistor 52, the stopping of the mirror assembly 74 is detected and the switching operation is carried out. This arrangement has an advantage in that it is simpler than an arrangement in which a current detecting element, etc. carry out a switching operation, but has the following disadvantage.

The flow of the overcurrent to the PTC thermistor 52 brings about the high resistance of the PTC thermistor 52, thereby bringing about the increase of voltage drop caused by the PTC thermistor 52. As a result, a current passing through the relay coil 53b decreases and accordingly the relay contact 53a is opened. After that, a voltage between both ends of the condenser 54 varies from a voltage value between both ends of the resistance 55 obtained immediately after the relay contact 53a is opened to a voltage value of the source obtained immediately before the resistance of the PTC thermistor 52 returns to its initial state after the natural cooling of the PTC thermistor 52.

This means that, during the variation, a current flows between point L and point 0 and passes through the relay coil 53b (to such an extent as not to cause the PTC thermistor 52 to be in a state of high resistance). Therefore, the relay coil 53b is excited and thereby the relay contact 53a is closed. However, since the dc motor 51 is still in a forced stopping state at this time, the PTC thermistor 52 is again heated immediately after the lapse of a short period of the slight temperature drop of the PTC thermistor 52 and heightens its resistance. Accordingly, the relay contact 53a is opened.

This operation is repeated until the voltage (charging voltage) between the ends of the condenser 54 reaches a voltage value obtained by subtracting from a source voltage value an applied voltage value (relay induction voltage) of the relay coil 53b requisite for closing the relay contact 53a. Thereafter, the relay contact 53a is kept opened.

In other words, when the opening operation between point i and point 0 is carried out once, the relay contact 53a is closed and opened repeatedly (this is known as "chattering"). The chattering results in not only the lag of the motor stopping action but also the shortening of the service life of the relay contact 53a. Especially since the dc motor 51 is a load (inductive load), a rush current is great, and accordingly the life of the relay contact 53a is remarkably shortened because of the chattering. Additionally, the possibility of bringing about malfunction exists.

It is possible that these disadvantages will be relieved to some extent by appropriately selecting a parameter, characteristic, etc., of each component of the circuit. However, since the condenser 54 and the PTC thermistor 52 each of which, of all the components of the circuit, electrically has a great change of state undergone with the lapse of time are connected in series to each other with respect to the battery source 57, it is extremely difficult to choose their optimum combination. Therefore, there is a limit to overcoming the above-mentioned disadvantages completely.

In addition, immediately after the remote control switch 56 is opened and before the PTC thermistor 52 is naturally cooled off, the PTC thermistor 52 shows high resistance. For this reason, when the switch 56 is again closed (when restart operations are carried out), the relay coil 53b cannot be sufficiently supplied with a current and therefore restart possibly cannot be made.

It is an object of the present invention to provide a control circuit for controlling the driving of a direct-current motor, in which the occurrence of chattering is prevented when the do motor is stopped, the lag of motor stopping action is prevented, the service life of a relay contact is lengthened, the malfunction of the relay contact is prevented, and restart is easily made.

SUMMARY OF THE INVENTION

In order to achieve the object, a control circuit for controlling the driving of a direct-current motor according to the Present invention comprises a dc electric power source; a dc motor for driving a thing to be driven, a power terminal of the dc motor being connected to an electrode of the dc electric power source at least via a relay contact and a control switch, the other power terminal of the dc motor being connected to the other electrode of the dc electric power source; a relay coil an end of which is connected to a connection point between the control switch and the relay contact via a condenser for startup and the other end is connected to the other power terminal of the dc motor, a relay being made up of the relay coil and the relay contact; a resistance for relay self-hold, an end of the resistance being connected to a point between the relay contact and the dc motor, the other end of the resistance being connected to a point between the condenser for startup and the relay coil; and a positive temperature coefficient thermistor disposed in a current path leading to the dc motor, the positive temperature coefficient thermistor raising its temperature and heightening its resistance because of an excess current generated when the thing being driven by the dc motor is physically stopped by a stopping member so that the dc motor becomes a state of overload, the resultant high resistance of the positive temperature coefficient thermistor lessening a current running through the relay coil which is performing self-hold, thereby opening the relay contact so as to stop the de motor.

In the control circuit, an end of the positive temperature coefficient thermistor is connected to a point between the control switch and the condenser for startup, and the other end of the positive temperature coefficient thermistor is connected to the relay contact. Alternatively, an end of the positive temperature coefficient thermistor is connected to a point between the dc motor and the resistance for relay self-hold, and the other end of the thermistor is connected to the relay contact.

The positive temperature coefficient thermistor is connected in parallel to the motor actuating condenser with respect to the dc electric power. Of all the circuit components, the motor actuating condenser undergoes an electrically greater change of state with the lapse of time as the positive temperature coefficient thermistor undergoes the same.

Accordingly, the positive temperature coefficient thermistor does not take any electrical action at the very moment of the actuation of the dc motor and after the do motor is stopped. For this reason, the optimum combinations of the circuit components including the motor actuating condenser can be easily determined. Additionally, chattering which occurs when the do motor is operated to stop can be prevented. Further, the lag of the motor stopping action is prevented, the life of the relay contact is lengthened, and malfunction is prevented.

The positive temperature coefficient thermistor may be disposed between the relay contact and a point between the control switch and the condenser for startup or may be disposed between the relay contact and a point between the dc motor and the resistance for relay self-hold. If so, restart is facilitated because the positive temperature coefficient thermistor does not exist in a current Path leading to the relay coil when the control switch is operated (when the do motor is actuated).

DETAILED DESCRIPTION OF THE PREFERRED EMBODIMENTS

Some embodiments of the present invention will be described with reference to the attached drawings.

Figure 1:
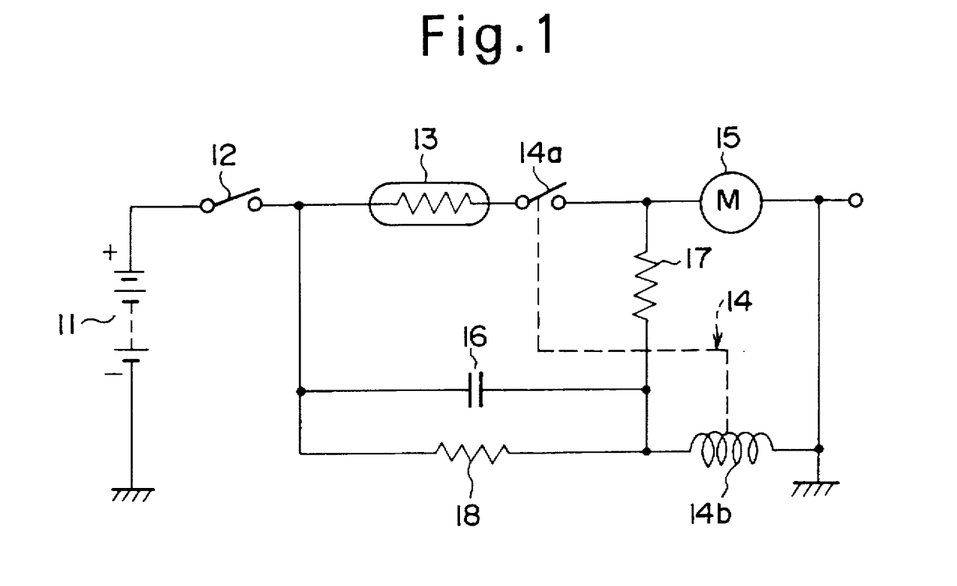
FIG. 1 is a control circuit for controlling the driving of a dc motor, showing a first embodiment of the present invention.

FIG. 1 shows a control circuit for controlling the driving of a direct-currant motor according to a first embodiment of the present invention. In FIG. 1, reference numeral 11 designates a battery power source (direct-current power source). A positive electrode (+) of the battery power source 11 is connected to a power terminal of a direct-current motor (dc motor) 15, by which devices to be driven, such as a door mirror, power seat, etc., are driven, via a remote control switch 12 used as a operating switch for operating the motor-driven devices, a PTC thermistor (positive temperature coefficient thermistor) 13, and a relay contact 14a. A negative electrode (−) of the battery power source 11 and the other power terminal of the do motor 15 are individually connected to a vehicle body's ground.

A relay 14 is made up of the relay contact 14a and a relay coil 14b. An end of the relay coil 14b is connected through a condenser 16 for startup to a point where the remote control switch 12 and the PTC thermistor 13 are connected to each other. The other end of the relay coil 14b is connected to the other power terminal of the do motor 15.

Reference numeral 17 designates a resistance for relay selfhold. An end of the resistance 17 is connected to a point between the relay contact 14a and the dc motor 15, and the other end of the resistance 17 is connected to a point between the condenser 16 and the relay coil 14b. Reference numeral 18 designates a resistance for discharging electricity from the condenser 16. The resistance 18 is connected to the condenser 16 in parallel.

In this embodiment, a device (not shown) to be driven by the de motor is a mirror assembly as in the case described with reference to FIG. 8. The PTC thermistor 13 stops the dc motor 15 in the following way. The mirror assembly driven by the dc motor 15 reaches a retracted position (this case is shown in FIG. 1) or in-use position (where the mirror assembly performs its normal function) and is physically stopped by a stopping member (not shown). The temperature of the PTC thermistor 13 is raised by an excess current generated when the do motor 15 reaches an overloaded state. Thereby, the PTC thermistor 13 heightens its own resistance, thereby lessening a current passing through the relay coil 14b which is performing self-hold. As a result, the relay contact 14a is opened to stop the de motor 15.

The operation of the control circuit according to the present invention will now be described. At the moment when the remote control switch 12 is closed in a state shown in FIG. 1, a current passes through the battery power source 11, the switch 12, the condenser 16, the relay coil 14b, and the vehicle body's ground. As a result, the relay coil 14b is excited.

Accordingly, the relay contact 14a is closed, and a current from the battery power source 11 passes through the PTC thermistor 13, the relay contact 14a, the dc motor 15, and the vehicle body's ground. As a result, the dc motor is actuated. At this time, in a current path leading to the do motor 15, a part of the current going from the relay contact 14a to the dc motor 15 branches off from the path and flows from the relay contact 14a to the vehicle body's ground through the resistance 17 and the relay coil 14b. The relay coil 14b is kept excited. Accordingly, the dc motor 15 remains running in a normal or reverse direction (in this case, the dc motor 15 runs in the normal direction), and the mirror assembly is retracted or protracted (in this case, the mirror assembly is retracted).

When the mirror assembly reaches the retracted position and cannot physically move still more, the current passing through the dc motor 15 reaches a stale of an excess current. Since the PTC thermistor 13 is disposed in the current path leading to the do motor 35, the excess current mentioned above also passes through the PIC thermistor 13. For this reason, the PTC thermistor 13 is heated and becomes high in resistance and, as a result, lessens the current passing therethrough. Accordingly, the current flowing to the relay coil 14b through the resistance 17 is also lessened, and the relay contact 14a is opened to cut off the current flowing to the dc motor 15.

If a charge remains stored in the condenser 16, a current cannot pass through the condenser 16 and the relay coil 14b in spite of the operation of the remote control switch 12. For this reason, the dc motor 15 cannot be restarted up. However, according to this embodiment, since the charge stored in the condenser 16 is discharged through the resistance 18 after the start-up of the dc motor 15, the above-mentioned disadvantage does not occur.

In the control circuit constructed as above, with respect to the battery power source 11, the PTC thermistor 13 is connected in parallel (not in series) to the condenser 16 which, like the PTC thermistor 13, electrically suffers a great change of state with the lapse of time among all the components of the control circuit. Accordingly, since the PTC thermistor 13 does not electrically perform any function at the very moment when the do motor 15 is actuated and after the dc motor 15 is stopped, the optimum combination of the circuit components including the condenser 16 can be easily determined. Thereby, the occurrence of chattering is prevented when the dc motor 15 is operated to stop, and the lag of the stopping action of the dc motor is prevented. Further, the service life of the relay contact 14a is lengthened, and malfunction is prevented.

Further, the restart of the dc motor 15 is facilitated because, as shown in FIG. 1, the PTC thermistor 13 is disposed between a point via which the remote control switch 12 is connected no the condenser 16 and the relay contact 14a, in other words, the PTC thermistor 13 does not exist in a current path through which a current flows to the relay coil 14b when the remote control switch 12 is switched on (i.e., when the dc motor 15 is actuated).

A similar effect can be obtained even if the PTC thermistor 13 is disposed between the relay contact 14a and a point via which the dc motor 15 is connected to the resistance 17.

Figure 2:
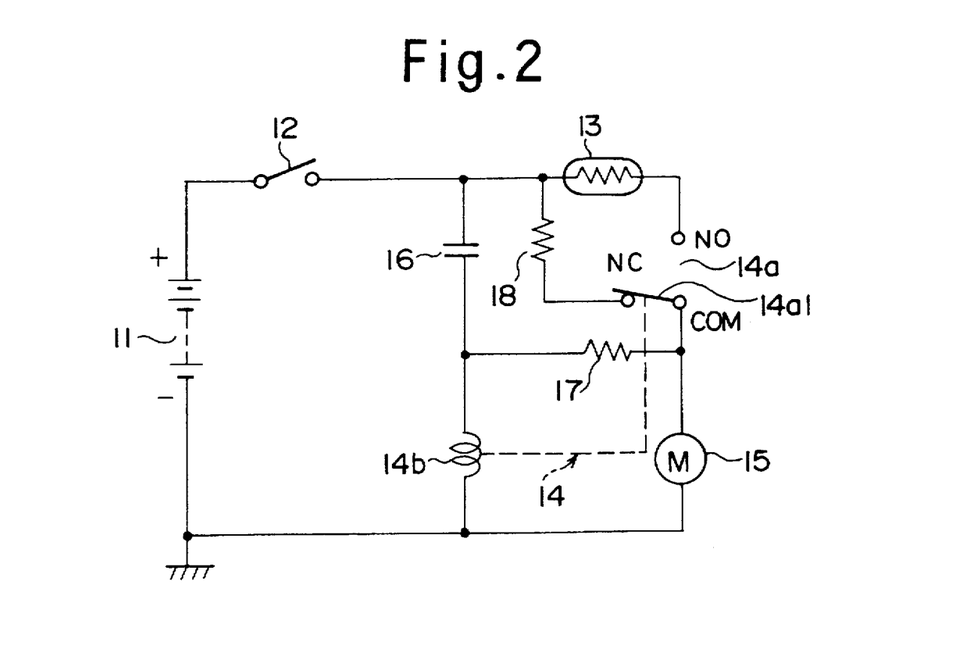
FIG. 2 is a control circuit for controlling the driving of a de motor, showing a second embodiment of the present invention.

Fig. 2 shows a second embodiment of the present invention. In FIG. 2, the same numerals are given to the same components or equivalents as in the first embodiment, respectively.

In the second embodiment, a relay contact 14a comprises a movable contact 14a1 connected to the do motor 15, a normally-closed fixed contact NC with which the movable contact 14a1 is brought into contact when the relay coil 14b is not excited, and a normally-opened fixed contact NO with which the movable contact 14a1 is brought into contact when the relay coil 14b is excited.

A PTC thermistor 13 is disposed between the fixed contact NO and a point via which a remote control switch 12 is connected to a condenser 16 for startup. A resistance 18 for discharging electricity from the condenser 16 is disposed between the fixed contact NC and the point via which the switch 12 is connected to the condenser 16. Except for this arrangement, the construction of the circuit is the same as in the first embodiment. In the second embodiment, the resistance 18 is inserted only when the relay coil 14b is not excited. The resistance 17 is also used in common as a resistance for discharging electricity from the condenser 16.

According to the second embodiment, the circuit arranged when the relay 14 is working (when the relay coil 14b is not excited) is simpler than that in the first embodiment. Accordingly, parameters, characteristics, etc. of the respective components of the circuit can be easily determined, and a late response occurring when the dc motor 15 is operated to stop can be prevented.

Figure 3:
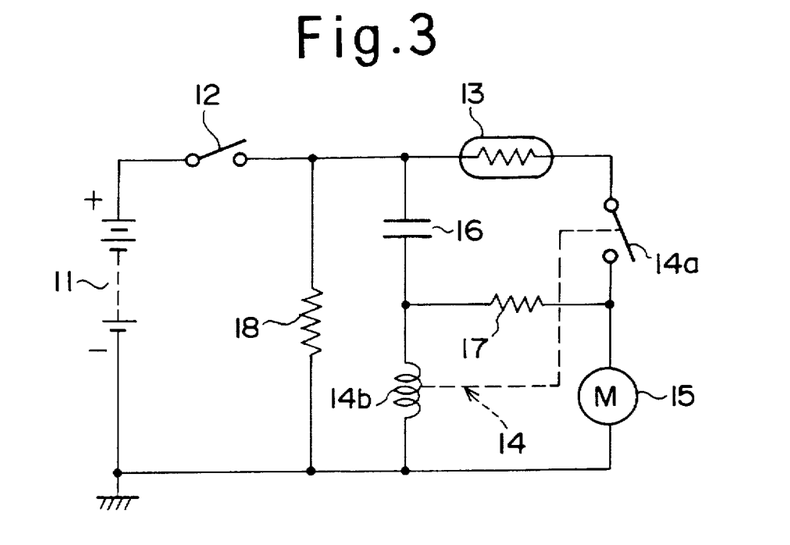
FIG. 3 is a control circuit for controlling the driving of a do motor, showing a third embodiment of the present invention.

FIG. 3 shows a third embodiment of the present invention. In Pig. 3, the same numerals are given to the same components or equivalents as in the first embodiment, respectively. In the third embodiment, as shown in FIG. 3, a resistance 18 for discharging electricity from a condenser 16 for startup is connected in parallel to a connection consisting of the condenser 16 and a relay coil 14b. Except for this arrangement, the control circuit is constructed in the same way as in the first embodiment. in the third embodiment, the resistance 18, is always connected in parallel to the condenser 16 via the relay coil 14h regardless of whether a relay 14 works or not (whether the relay coil 14b is excited or not).

According to the third embodiment, electricity is discharged from the condenser 16 more quickly and more certainly than in the second embodiment. In detail, the discharge from the condenser 16 in the circuit shown in FIG. 2 is carried out when the relay coil 14b is not excited (i.e., when the relay 14 does not work) and, for this duration, a resistance 17 for relay self-hold besides the resistance 18 is included in the charging circuit. Accordingly, the determination of parameters, characteristics. etc., of these resistances becomes relatively difficult, and a time constant thereof becomes larger.

In contrast, in the circuit shown in FIG. 3, the resistance of the relay coil 14b is negligibly small when the relay coil 14b is not excited (when the relay 14 does not work). It might be allowable to say that only the resistance 18 is connected in parallel to the condenser 16. Accordingly, the determination of the parameters, characteristics, etc. can be easily made, and the time constant can be made small. As a result, the discharge from the condenser 16 is carried out quickly and certainly.

Figure 4:
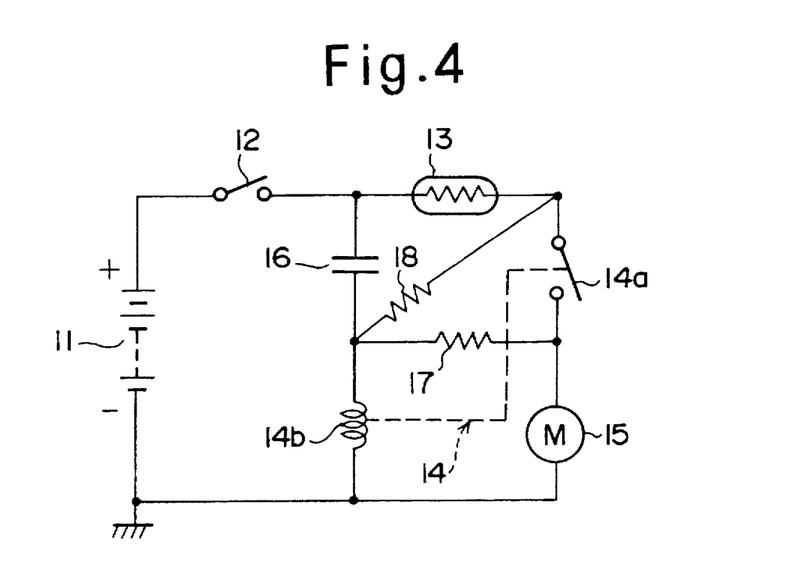
FIG. 4 is a control circuit for controlling the driving of a do motor, showing a fourth embodiment of the present invention.

FIG. 4 shows a fourth embodiment of the present invention. In FIG. 4, the same numerals are given to the same components or equivalents as in the first embodiment, respectively. In the fourth embodiment, as shown in FIG. 4, a resistance 18 for discharging electricity from a condenser 16 for startup is disposed between a point via which a PTC thermistor 13 is connected to a relay contact 14a and a point via which the condenser 16 is connected to a relay coil 14b. Except for this arrangement, the control circuit is constructed in the same way as in the first embodiment shown in Fig.

In the fourth embodiment, the resistance 18 is always connected in parallel to the condenser 16 via the PTC thermistor 13 regardless of whether a relay 14 works or not (whether the relay coil 14b is excited or not).

According to the fourth embodiment, electricity is discharged from the condenser 16 more quickly and wore certainly than in the circuit shown in FIG. 2.

In the circuit shown in FIG. 4, the resistance of the PTC thermistor 13 is negligibly small when the relay coil 14b is not excited (when the relay 14 does not work). It might be allowable to say that only the resistance 18 is connected in parallel to the condenser 16. Accordingly, the determination of the parameters, characteristics, etc. can be easily made, and the time constant can be made small. As a result, the discharge from the condenser 16 is carried out quickly and certainly.

In the above embodiments, a description was given of only the case in which the motor-driven retractable door mirror device is retracted. If the circuit is constructed such that the polarity of the battery power source 11 is inverted to supply electric power) the door mirror device can return to the in-use position. Usually, a pair of motor-driven retractable door mirror devices are mounted on the right-hand and left-hand sides of a vehicle body, respectively. In this case, the control circuits according to the present invention may be applied to the right-hand and left-hand door mirror devices, respectively.

Further, in the above embodiments, a description was given of the case in which the present invention is applied to a control circuit for controlling the driving of a direct-current motor used to drive a motor-driven retractable door mirror device. Of course, the present invention is applicable to, in a broad sense, a motor controlling technique in which a dc motor is stopped when a device to be driven by the dc motor is brought into contact with a stopping member.

As mentioned above, according to the present invention, various advantages can be obtained. For example, chattering which occurs when a dc motor is operated to stop is prevented, the lag in the stop of the motor is prevented, the life of a relay contact is lengthened, operational malfunction is prevented, and restart is facilitated.

What is claimed is:

1. A control circuit for controlling the driving of a direct-current (dc) motor to drive a mirror assembly of a vehicle, comprising:

a dc electric power source;

a first power terminal of said dc motor being connected to an electrode of said dc electric power source via a relay contact and a control switch, a second power terminal of said dc motor being connected to the other electrode of said dc electric power source;

a relay coil for actuating said relay contact, an end of said relay coil being connected to the first power terminal of said dc motor via a resistance for relay self-hold, the other end of said relay coil being connected to the second power terminal of said dc motor;

a condenser for startup, an end of said condenser being connected to the electrode of said dc electric power source via said control switch, the other end of said condenser being connected to the end of said relay coil; and a positive temperature coefficient thermistor disposed in a current path including said dc electric power source, said control switch, said relay contact, and said dc motor; said positive temperature coefficient thermistor being such that a resistance thereof becomes higher as a temperature thereof rises;

wherein when the mirror assembly that is being driven is forcibly stopped and thus said dc motor reaches a state of overload, the resistance of said positive temperature coefficient thermistor is raised because of an increase in temperature resulting from an excess current and thereby a current running through said relay coil that is performing self-hold is reduced, to shut off the excess current by opening said relay contact; and wherein said positive temperature coefficient thermistor disposed in a current path between said relay contact and said control switch is connected in parallel to said condenser for startup.

2. The control circuit of claim 1, further comprising a discharge resistance for causing said condenser to discharge, said discharge resistance being connected in parallel to said condenser.

3. The control circuit of claim 1, wherein said relay contact comprises a single movable contact connected to the first power terminal of said dc motor, a non-excitation fixed-contact with which said movable contact is brought into contact when said relay coil is not excited, and an excitation fixed-contact with which said movable contact is brought into contact when said relay coil is excited;

said positive temperature coefficient thermistor is disposed in a current path between said excitation fixed contact and said control switch; and an end of a discharge resistance for said condenser is connected to an end of said condenser, whereas the other end of said discharge resistance is connected to said non-excitation fixed-contact.

4. The control circuit of claim 1, further comprising a discharge resistance for causing said condenser to discharge, said discharge resistance being connected in parallel to a direct connection which includes said condenser and said relay coil.

5. The control circuit of claim 1, further comprising a discharge resistance for causing said condenser to discharge, an end of said discharge resistance being connected to a point where said positive temperature coefficient thermistor and said relay coil are connected to each other, the other end of said discharge resistance being connected to a point where said positive temperature coefficient thermistor and said relay contact are connected to each other.

* * * * *